July 11, 1944.    H. J. FOWLER    2,353,154
PHOTOGRAPHIC APPARATUS FOR MAKING PERIODIC TIME-RECORDED EXPOSURES
Filed April 22, 1943    4 Sheets-Sheet 1
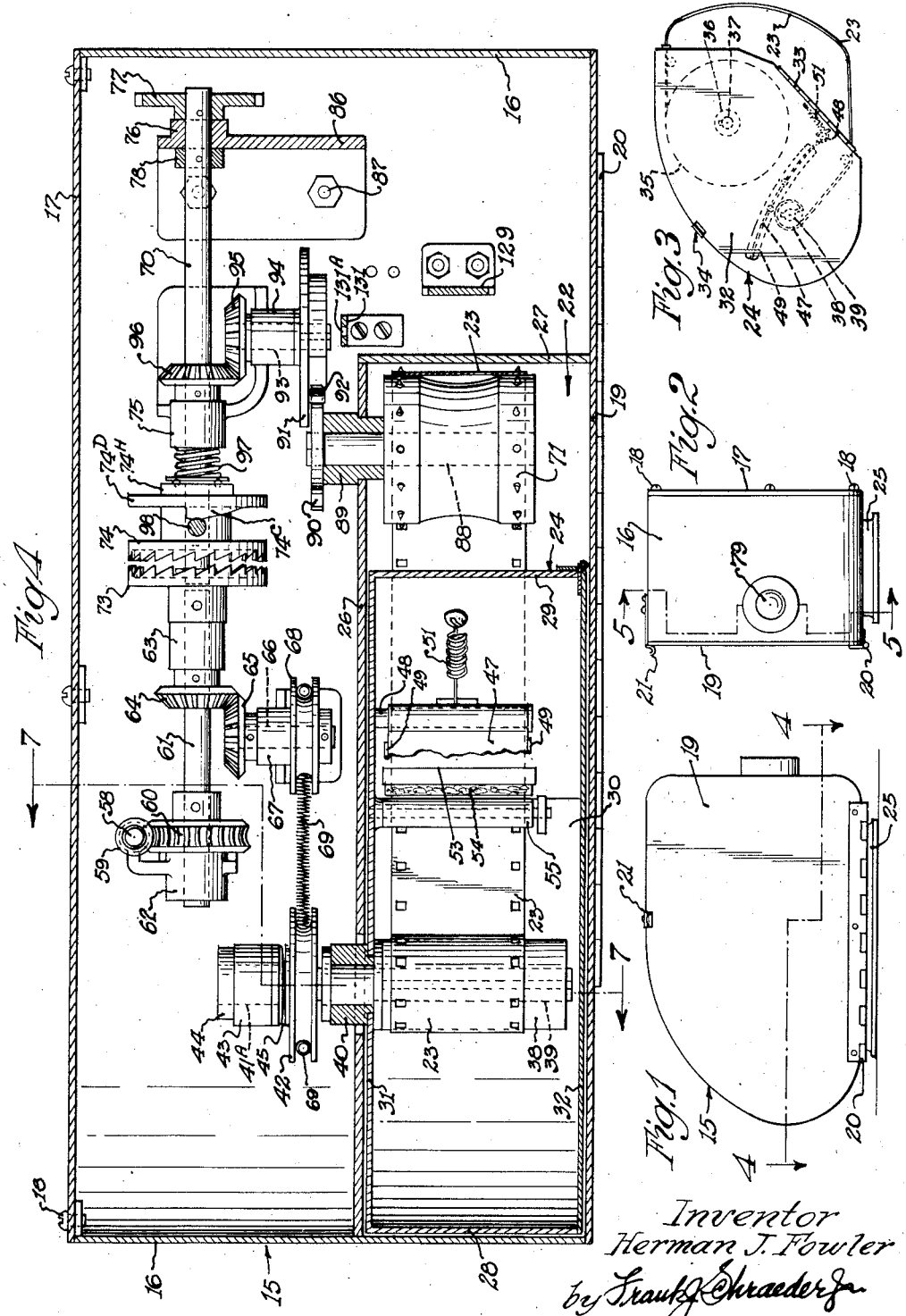
Inventor
Herman J. Fowler
by Frank J. Schraeder Jr.
Attorney.

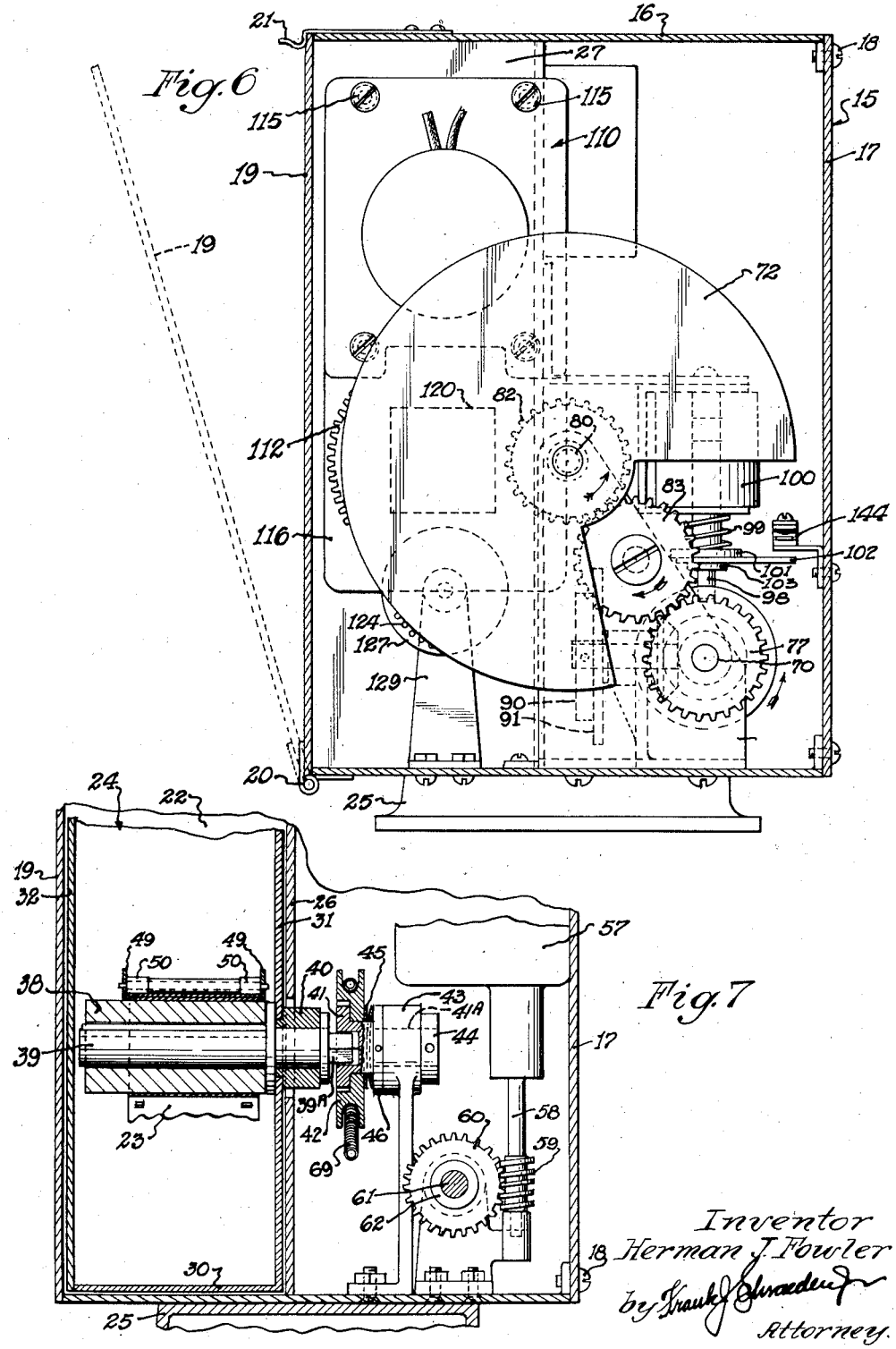

July 11, 1944. H. J. FOWLER 2,353,154
PHOTOGRAPHIC APPARATUS FOR MAKING PERIODIC TIME-RECORDED EXPOSURES
Filed April 22, 1943 4 Sheets-Sheet 4
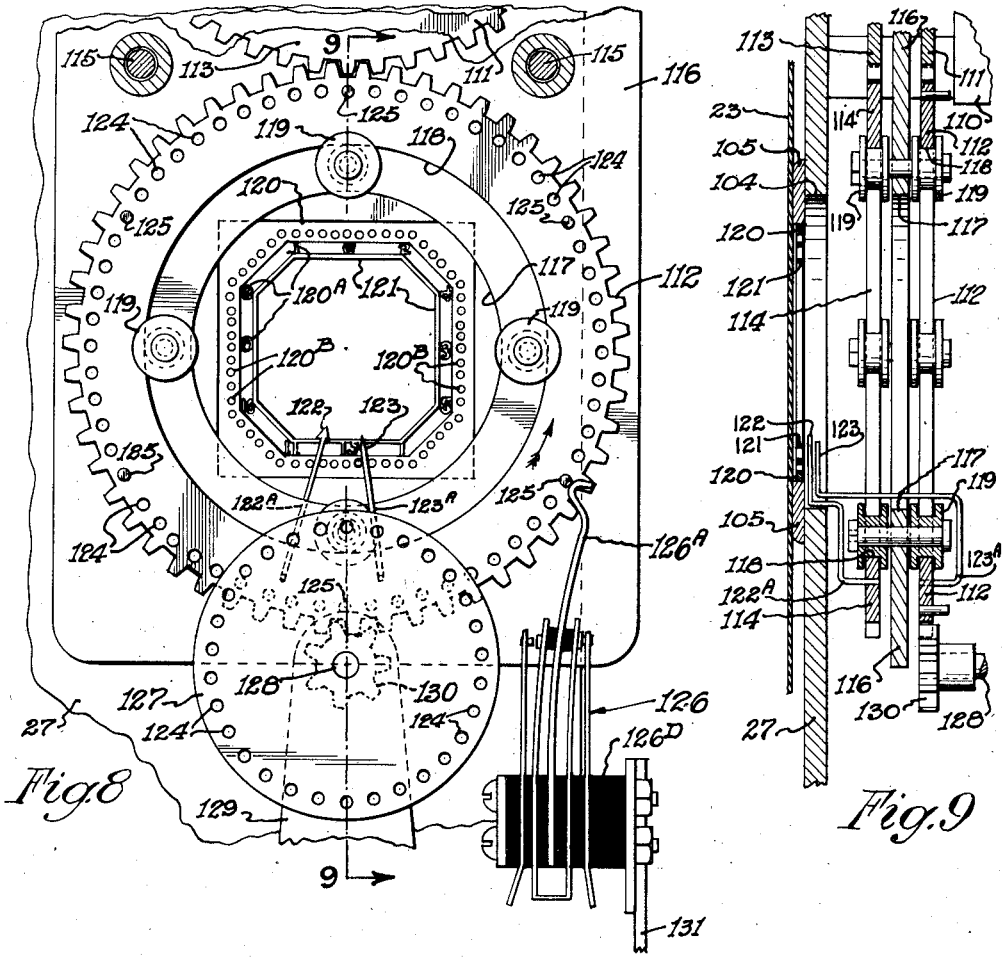
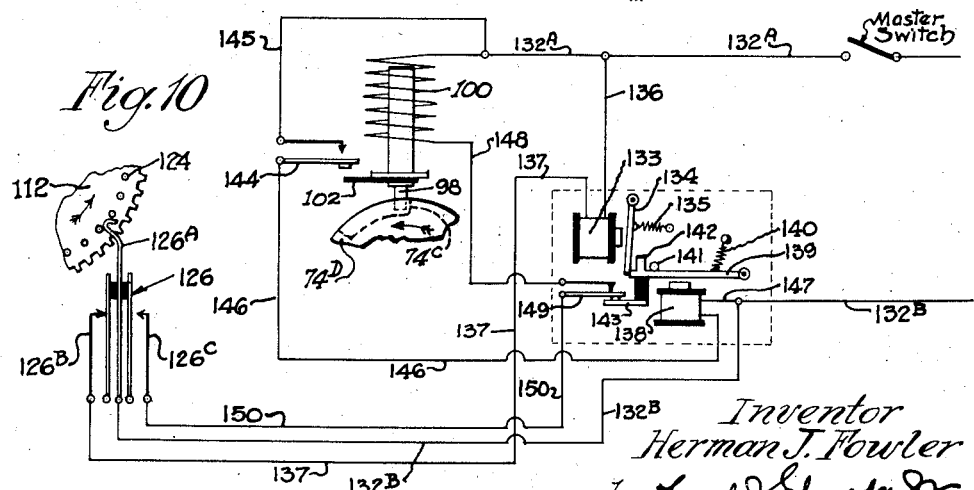
Inventor
Herman J. Fowler
by Frank J. Schraeder
Attorney.

Patented July 11, 1944

2,353,154

UNITED STATES PATENT OFFICE 2,353,154

PHOTOGRAPHIC APPARATUS FOR MAKING PERIODIC TIME-RECORDED EXPOSURES

Herman J. Fowler, Chicago, Ill.

Application April 22, 1943, Serial No. 484,100

9 Claims. (Cl. 161—26)

This invention relates generally to photographic apparatus for making periodic time-recorded exposures. More particularly, my invention is directed to and has among its objects to provide an automatically operated photographic apparatus for automatically periodically making a series of photographic exposures on a sensitive film and simultaneously recording on the film, in connection with each exposure, the time at which each such exposure was made.

My invention contemplates the making of the series of successive photographic time-recorded exposures on a strip film such as used, as for example, in motion picture work and one of the features of my invention resides in the novel arrangement of the film reels or spools, in the novel construction of the magazine therefor, and in the novel film-centering and protecting means for guiding the exposed portion of the film onto its receiving spool.

Another feature of my invention is found in the novel means employed for permanently recording on the film, and in conjunction with each exposure, the time at which each such exposure was made.

Another feature of my invention resides in the provision of improved adjustable means for selectively varying the time periods between the series of exposures.

Other novel features of the invention reside in the novel mechanism employed in the automatic operation of the apparatus and in the electrical control therefor.

With the above and other objects in view which will become readily apparent from the perusal of the attached drawings in which I illustrate one embodiment of my invention, my invention consists in the novel combination, construction and arrangement of the members and parts shown in preferred embodiment in the attached drawings, described in the following specification and particularly pointed out in the appended claims.

In the drawings:

Fig. 1 is a side view of photographic apparatus embodying my invention and shown in reduced scale;

Fig. 2 is a front view of the apparatus;

Fig. 3 is a side view of the film magazine;

Fig. 4 is an enlarged horizontal section taken on line 4—4 of Fig. 1 showing the main drive shaft, film magazine and film drive mechanism;

Fig. 6 is a vertical section taken on line 6—6 of Fig. 5 showing the shutter, shutter drive, main drive shaft and clutch operating solenoid;

Fig. 7 is a vertical section taken on line 7—7 of Fig. 4 showing portions of the electric drive motor, main drive shaft, the film tension and take-up and the film-centering means for guiding the exposed film portion during winding onto its receiving spool;

Fig. 8 is a still further enlarged front view of the time-recording means and the adjustable means for periodically recording the time on each film exposure;

Fig. 9 is a vertical section through the time-recording means taken on line 9—9 of Fig. 8; and Fig. 10 is a diagrammatic illustration of the electrical system for controlling the period operation of the shutter and the periodic movement of the film.

Figure 5:
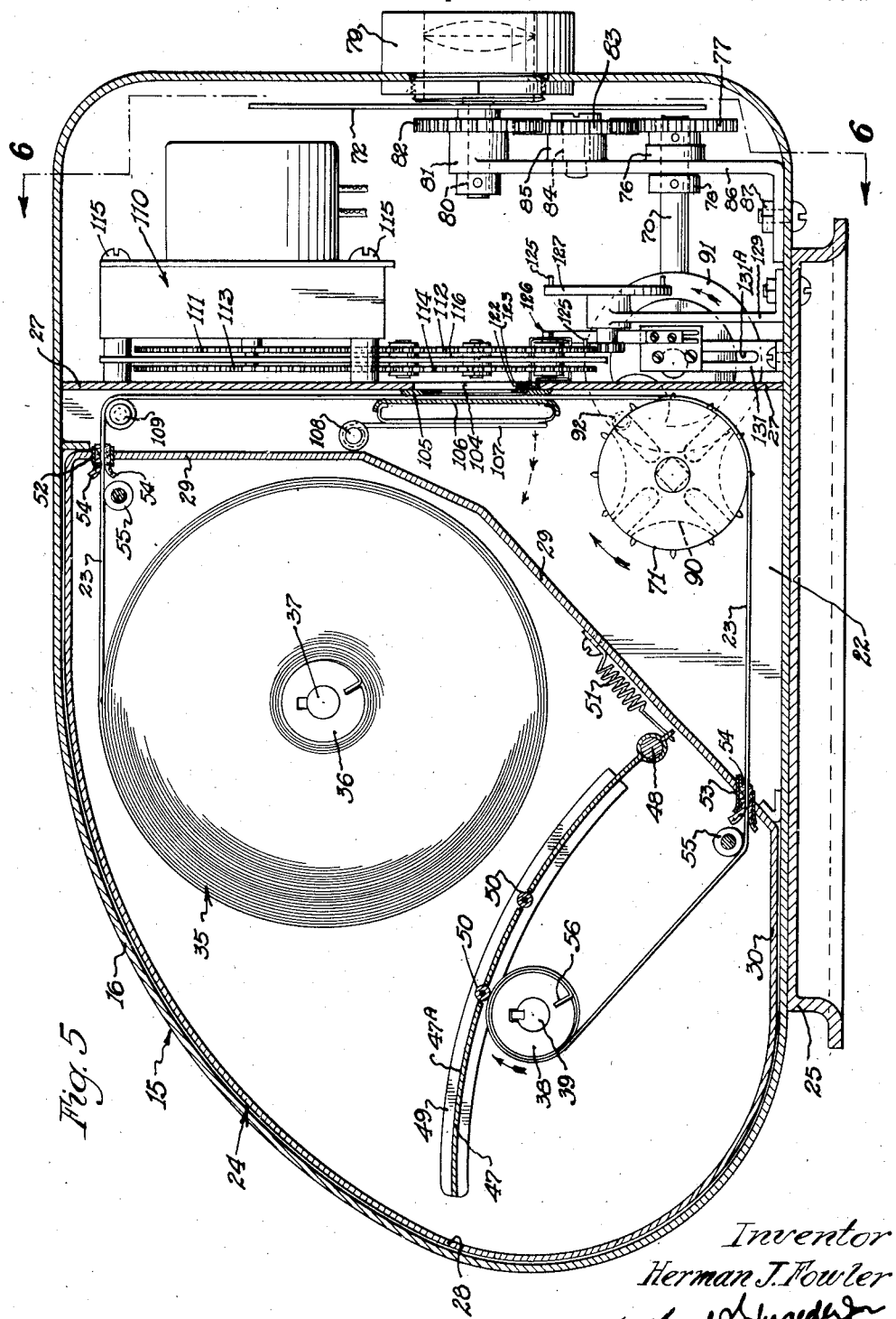
Fig. 5 is a vertical section taken on line 5—5 of Fig. 2 showing the film magazine, film drive mechanism, electric clock, shutter and shutter-operating mechanism.

In the attached drawings, and as shown in preferred embodiment particularly in Figs. 1 to 7 inclusive, my invention comprises a housing 15 consisting of a stream-lined central plate portion 16 forming the combined rear, top, front and bottom wall of the housing 15, a side wall closure plate 17, connected as by screws 18 or otherwise to the wall plate 16, and a closure cover plate 19 hingedly connected, by hinge 20, to the bottom portion of the wall plate 16 and held in closed position by a suitable spring latch 21.

The housing 16 for the apparatus is preferably mounted on a suitable base 25.

As more clearly shown in Figs. 4 to 7, inclusive, I provide within the housing 15 a separate compartment 22 for the film 23 and film magazine, which is generally indicated by numeral 24.

The compartment 22 is defined by the enclosing walls 26 and 27 and is closed by the housing cover 19.

My improved film magazine 24 is designed to conserve space and material and is stream-lined to enclose a film reel of substantial diameter with considerable length of film thereon and a receiving reel or spool together with an improved film-centering and guiding means. I achieve the desired conservation of space and material by arranging and locating the centers or axes of the film feeding and receiving spools at points which are spaced a minimum linear distance between them and which distance is less than the diameter of the roll of unexposed film and which minimum distance between these spools is just sufficient to permit the exposed film to be wound upon the receiving spool and to progressively grow in diameter and not interfere with the unexposed film portion on the feeding spool which progressively decreases in diameter during the growth of the reel of exposed film as it is wound upon the receiving spool.

The casing for the film magazine 24 may be described as formed generally in oval shape and having a combined arcuate top and rear wall 28, the top wall portion being extended into a front vertical wall 29 which extends downwardly rearwardly to form a horizontal base portion 30 which connects with the arcuate rear wall portion of the wall 28.

As more clearly shown in Figs. 3 and 4, the magazine wall portions 28, 29 and 30 are provided with a side closure wall 31 and a cover 32 which is hingedly connected to the front wall portion 29 as at 33. The cover 32 is held in closed position by any suitable latch 34 similar, for example, to the latch 21 for the housing cover 19.

I contemplate the use of film spools without flanges.

The unexposed film reel 35 is provided with the film-feeding spool 36 which is slidably mounted on and keyed to spindle 37 and the film-receiving spool 38 is slidably mounted on and keyed to the spindle 39. Both spindles 37 and 39 are cantilevered from and rotatably supported in bearings 40 rigidly secured in openings within the magazine side wall 31 in any suitable manner to prevent leakage of light through the openings in which they are mounted.

The film-receiving spool spindle 39 is provided with an extension 39A of square cross-section for engagement within a square opening in the flanged central hub member 41 of the friction clutch sheave 42 which is rotatably supported on the flanged central member 41.

The flanged central hub member 41 is formed with an integral stub shaft 41A which is rotatably supported in the upstanding bracket bearing 43 and held against longitudinal displacement by a set screw collar 44.

Between the sheave 42 and the bearing 43 is a plurality of resilient dished washers 45 and a flat faced adjustment washer 46, set-screwed to the stub shaft 41A, the washer 46 is adapted to be adjusted to cause the resilient washers 45 to press the sheave 42 into frictional engagement with the flange of the central hub member 41 to cause the hub member 41 and the spindle 39 and its receiving spool 38 to rotate with the sheave 42. The function of this friction clutch is that of a tension take-up for winding the exposed film portion upon the film-receiving spool 38. Such frictional drive permits the driving of the film-receiving spool at variable speeds conforming to the growing diameter of the film reeled thereon and always insuring sufficient tension upon the film fed thereto.

The improved film-protecting, centering and guiding means mounted within the magazine 24 consists of an arcuate plate 47, preferably finished with a highly polished smooth upper face 47A, pivotally mounted on the pivot pin 48.

The plate 47 is centrally disposed between a pair of arcuate side arms 49 spaced to guide the marginal edges of the film therebetween. Intermediate the upper and lower ends of the plate 47, and intersecting the plate 47, I provide at least two sets of spaced rollers 50, one or the other of which sets of rollers is adapted to continuously engage and ride on the marginal portions of the film as it is wound upon the receiving spool 38 to thereby guide and slightly press the film during its winding movement. The desired slight pressure is preferably attained by means of a very light coil spring 51 having one end secured to the plate 47 and its opposite end anchored to the casing wall 29.

The plate 47 also performs the important function of preventing any possibility of an unwound loop portion of the film from the film-feeding spool to come in contact with a portion of the film being wound onto the film-receiving spool and thus possibly cause abrasions of the emulsified film face.

The magazine 24 is loaded in a dark room with the film reel 35 positioned as shown in Fig. 5 and with the film leading end extended through slit apertures 52 and 53, made proof against leakage of light by felt pads 54, and trained about rollers 55 with its end secured in the slot 56 of the film-receiving spool 38. Fig. 3 shows the closed loaded magazine with the extended loop of the leading end of the film ready for insertion into operative position within the housing 15.

The driving mechanism includes any source of motive power such as a constant speed electric motor 57. As shown on the attached drawings, the electric motor shaft 58 is provided with a worm pinion 59 which is keyed to the motor shaft 58 and operatively in mesh with the worm gear 60 keyed to the main drive shaft 61.

The main drive shaft 61 is supported in spaced bearings 62 and 63 and has secured or keyed thereto a bevel gear 64 which is in mesh with the bevel gear 65 secured to a stub shaft 66 carried in the bearing 67.

A sheave 68 is secured to the stub shaft 66 and this sheave 68 by means of the belt 69, trained about it and the sheave 42, imparts constant rotary motion, through its frictional engagement with its separate hub member 41 and spindle 39, to the film-receiving spool 38.

The constantly rotating main drive shaft 61 also intermittently imparts rotary motion to the intermittently operable driven shaft 70 which is employed to cause intermittent rotations of the film-propelling drum sprocket 71 and the shutter 72, and these intermittent operations are attained by an intermittently actuable clutch of suitable design.

The shafts 61 and 70 are end aligned and, as shown in Fig. 4, are provided with complementary friction clutch elements 73 and 74 which for illustrative purposes are shown as of the serrated face type. The clutch element 73 is secured to one end of shaft 61 and the other clutch element 74 is slidably mounted on and keyed to one end of the intermittently operable driven shaft 70.

The intermittently operable film and shutter drive shaft 70 is supported in the spaced bearings 75 and 76. The main shutter drive gear 77 is secured to the outer end of shaft 70 and a set collar 78 may be added thereon adjacent the bearing 76 to retain the shaft 70 against longitudinal shifting movement.

The front portion of the casing wall 16 is provided with suitable lens 79 centered for alignment with the longitudinal center-line of the film 23.

The disk shutter 72 is secured to a stub shaft 80 which is carried in bearing 81 and the shaft 80 and shutter 72 are rotated by the shutter drive gear 82 which is also secured to shaft 80. The shutter drive gear 82 is driven by the main shutter drive gear 77 through an intermediate drive gear 83 which is mounted on the stub shaft 84 carried in the bearing 85. As more clearly shown in Figs. 5 and 6, the bearings 76, 81 and 85 are all preferably shown as integral with their common supporting bracket 86 which is suitably secured, as by bolts 87, to the bottom of the housing 15.

As above indicated the film-propelling or drive sprocket 71 and the shutter 72 are both adapted to be driven by the intermittently rotatable driven shaft 70. The sprocket 71 is of the well known type having two sets of circumferentially spaced teeth adapted to interengage with the spaced marginal rows of film perforations to thereby propel the film 23.

The sprocket 71 is fixed to shaft 88 which is carried in the bearing 89 supported in the wall 26. The shaft 88 is provided with a square end to receive thereon the Maltese cross element 90 of the well known Geneva movement which includes the disk operator 91 with a roller 92 thereon.

The Geneva disk operator 91 is secured to shaft 93 which is carried in the bearing 94.

The Geneva movement is arranged to intermittently rotate the film drive sprocket 71 through rotary motion of the shaft 93 by means of the bevel gear 95 which is fixed thereto and in mesh with the bevel gear 96 fixed to shaft 70.

As above pointed out, the intermittent operation of the shaft 70 is attained through the clutch parts 73 and 74. As shown in Fig. 4 these clutch parts or elements are in disengaged position.

The clutch element 74 includes a cam disk 74$^D$ having a cam 74$^C$ and this cam disk is made an integral part of the clutch element 74 by the connecting hub 74$^H$. A coil spring 97 mounted about shaft 70, between the hub 74$^H$ of the clutch element 74 and the bearing 75, tends to move the clutch element 74 into operative engagement with its cooperating clutch element 73. As shown in Fig. 4, the element 74 is restrained in inoperative position or disengaged from element 73 after having been shifted, against the pressure of spring 97, from its frictional clutching engagement with element 73 by the engagement of its cam 74$^C$ with the plunger 98 of the solenoid 100.

When the solenoid 100 is deenergized its plunger 98 is in its lowermost or dropped position as shown in Fig. 4, and to insure the movement of the solenoid plunger 98, into such lowered or de-clutched position, I interpose a light coil spring 99 between the solenoid 100 and a disk collar 101 which is secured to the plunger 98.

The solenoid plunger 98 also carries a switch-operating arm 102 which is secured to the plunger 98 between the collar 101 and the collar 103 also secured to the plunger 98.

The front wall 27 of the film compartment 22 is provided with an aperture 104 which is aligned with the axis of the lens 79 and this aperture is preferably provided with a frame 105 over which the film 23 rides while retained by the film-pressure plate 106 supported on the depending leaf spring 107 pivotally supported at 108; the exposed loop portion of the film lead being trained over the over-head corner rollers 109, between the film-pressure plate 106 and the aperture frame 105 and around the driving sprocket 71.

The time-recording mechanism includes a suitable clock 110, preferably an electric clock, which is provided with a minute-hand operating gear 111 and an hour-hand operating gear 113.

The clock 110 is secured to the film-compartment front wall 27, as by screws 115, and carries a depending supporting plate 116 which is provided with a circular opening 117 centralized with the center of the aperture 104.

The supporting plate 116 functions to support the time-recording minute-hand-carrying-gear 112, which is in operative mesh with the clock minute-hand operating gear 111, and the time-recording hour-hand-carrying-gear 114 which is in operative mesh with the clock hour-hand operating gear 114.

As shown more clearly in Figs. 5, 8 and 9, the minute and hour-hand-carrying-gears 112 and 114 consist of ring gears having outer circular toothed faces and plain inner circular faces 118 which are rotatably supported on a plurality of circumferentially spaced pairs of rollers 119 supported on bolts or the like which are securely mounted on the supporting plate 116.

The aperture frame 105 carries an inserted plate 120 of very thin metal representing a clock dial and is provided with a central opening 121 through which the photographic image is projected onto the film. The area surrounding the opening 121 is provided with suitable perforations representing hour-indicating numerals 120$^A$ and spaced circular perforations representing minute indications 120$^B$.

Cooperating with the hour and minute indications of the clock dial are an hour-indicating hand 122 and a minute-indicating hand 123.

The hour hand 122 is provided with a bent integral extension 122$^A$ for securing it to gear 114 and the minute hand 123 is provided with a bent integral extension 123$^A$ for securing it to the gear 112.

Obviously every exposure on the film 23 made through the clock dial 120 will receive thereon a photographic silhouette of the clock dial together with the hour and minute hands indicating the time at which such exposure was made and the photographed image recorded on the film will appear within the area defined by the aperture 121 of the clock dial.

The minute-hand gear 112 is provided with sixty equally spaced perforations 124 representing sixty minute spaces and the perforations 124 being adapted to receive therein switch-operating pins 125.

The pins 125 are adapted to operate the main control switch 126 by their period engagement with the switch arm 126$^A$ and thus adjustably, selectively and intermittently record a series of photographic exposures on successive portions of the film 23.

Since the minute-hand gear 112 makes one revolution each hour, the spaced perforations 124 move into successive positions each minute of time.

As shown in Figs. 8 and 9 for illustrative purposes, six pins 125 are inserted in equally spaced openings 124 to thereby successively operate the control switch 126 every ten minutes.

Obviously, successive film exposures could be made at the rate of one every hour by inserting only one of the pins 125 in one of the perforations 124, or if twelve equally spaced pins were inserted an exposure would be made every five minutes, and if all sixty pins were inserted one exposure would be made every minute.

In the event more rapid or frequent film exposures are desired, I provide an auxiliary switch-operating disc wheel 127 which is secured to one end of shaft 128 mounted in the bearing of an upstanding bracket 129. The other end of shaft 128 has secured thereto a small gear 130 which is operatively in mesh with the minute-hand gear 112.

The disc wheel 127 is provided with a plurality of equally spaced perforations or openings 124 adapted to receive one or more of the control switch operating pins 125.

As shown in Figs. 8 and 9, the ratio between the number of gear teeth on the minute-hand gear 112 and those on the small gear 130 is 8 to 1, hence, the disk wheel 127 will make eight revolutions each hour or one complete revolution every seven and one-half minutes. If thirty pins 125 were inserted in all of the thirty perforations in the disc wheel 127 then one film exposure would be made every fifteen seconds and if the pins 125 were alternately spaced then one exposure would be made every thirty seconds.

It will be understood that to secure such rapid successive exposures the switch 126 would necessarily have to be moved into operative position for actuation by the pins of the disc wheel 127 and this is possible simply by moving the upstanding bracket 131 on which the switch 126 is adjustably mounted.

The control switch 126 is vertically adjustably supported on its block 126D in an elongated bolt opening 131A of the bracket 131 so that when the bracket 131 is moved to register the switch-operating arm 126A in register with the pins 125 of the disc wheel 127 it may also readily be lowered into proper operative position.

Obviously, the rapidity with which successive film exposures may be made is dependent upon the ratio of the number of gear teeth on the minute-hand gear 112 to the number of gear teeth on the small gear 130 as well as the spacing of the pin perforations 124 in the disc wheel 127.

The operation of the apparatus may be more readily understood from the description of the operation of the electrical system in conjunction with the mechanical elements controlled thereby.

As shown in Fig. 10, the electrical system includes the current supply lines 132A and 132B.

The locking relay electromagnet 133 is connected at one post with the power line 132A by a conductor 136. A conductor 137 connects the other post of the electromagnet 133 with the switch arm 126B of the main control switch 126 which has a central operating arm 126A connected to the power line 132B.

The locking relay includes an armature 134 which is adapted to be released into open position by a spring 135.

The circuit for the locking relay comprises the power line 132A, conductors 136 and 137, main control switch arms 126B and 126A and the power line 132B.

The electrical system also includes a resetting relay comprising an electromagnet 138, armature 139, a spring 140 to release the armature 139 into open position, a stop 141 for the armature 139, a stop 142 for the armature 134 carried on the armature 139, and an insulated switch-operating arm 143 carried on the armature 139.

The circuit for the resetting relay includes a normally open switch 144 which is adapted to be periodically closed by the switch-operating arm 102 carried on the solenoid plunger 98. This resetting relay operating switch 144 is connected at one post by a conductor 145 with the power line 132A and at its other post by another conductor 146 which is connected at its other end with one end of the armature 138, the other end of the armature 138 is connected by the conductor 147 to the power line 132B.

The circuit for the solenoid 100 includes its connection at one post with the power line 132A, a conductor 148 connecting the other post of the solenoid with one post of the solenoid-operating switch 149.

The other post of the solenoid-operating switch 149 being connected by the conductor 150 to the main control switch arm 126C.

The normally open solenoid switch 149 is adapted to be periodically closed by arm 143 of the resetting relay.

As shown in Fig. 10 the circuits of the electrical system show the locking relay in energized condition in which the cooperating mechanical elements are maintained positioned as illustrated in Figs. 4, 5, 6 and 7 wherein the main control switch 126 is shown with the circuit open between the arms 126A and 126C and closed between the arms 126A and 126B to thus energize the locking relay armature 133. Although the resetting switch arm 143 has closed the solenoid switch 149, the solenoid is not energized because the solenoid circuit is open between the main control switch arms 126A and 126C, hence the driven shaft 70 and its operating elements are in the condition shown in Fig. 4, with the film 23, its drive mechanism and the shutter all in stationary or inoperative position.

When the minute-hand gear 112 (or disc wheel 127) has moved to operative position wherein one of the pins 125 has engaged and moved the arm 126A, of the main control switch 126, into operative position to close the circuit between the arms 126A and 126C, the solenoid circuit will thus be closed and will be retained closed until the arm 126A has been released from its engaged position by the pin 125 to move into normal position to close the circuit between arms 126A and 126B.

When the solenoid circuit is closed by the pin 125, as above stated, the solenoid 100 will be energized, the plunger 98 will be retracted into the solenoid and thus release its contact with the cam 74C to release the spring-pressed cam disk 74D and thereby move the clutch elements 74 and 73 into operative position to cause the rotation of the driven shaft 70.

Shortly after the shaft 70 has been placed into rotation by the plunger-released movement of the cam disk 74D, the solenoid 100 will become deenergized by the closing of the resetting switch 144, through the upward movement of the arm 102 secured to the solenoid plunger 98, to thereby cause energization of the electromagnet 138 and the opening of the circuit through switch 149. Although the solenoid is therefore energized a very short time, its release of the cam 74C, during its brief period of energization, will of course permit the clutch elements 74 and 73 to move into operative position to cause a rotation of the shaft 70 for a complete cycle of operation until the cam 74C again engages the plunger 98 of the deenergized solenoid whereupon the rotation of the drive shaft 70 will be stopped until the solenoid is again energized by the closing of the circuit between the arms 126A and 126C by the succeeding minute-hand gear pin 125 after the interim closing of the resetting relay circuit which occurs when the switch arm 102 closes the resetting relay switch 144.

During the single rotation of the shaft 70, the film is first moved the length of one exposure and arrested.

During the movement of the film, by the film-driving sprocket 71 through the Geneva movement and gears 95 and 96, the shutter 72 is also simultaneously progressively rotated, but the exposure opening of the shutter does not enter its phase of operative movement to permit an exposure of the film until the film has been arrested and is in stationary position.

This sequence of film and shutter movements is attained through the Geneva movement and the arrangement in the shutter-operating gear train consisting of the gears 77, 83 and 82.

Although the apparatus is shown arranged and described in such manner that the movements of the film precede the exposures, it will be readily apparent from the drawings and the above specification of the operative mechanical parts that the Geneva movement could be arranged to cause the movement of the film after each exposure by the shutter.

The apparatus is adapted to make photographic film exposures at irregularly spaced periods of time by simply arranging the spacing of the actuator pins 125 accordingly. As for example, five pins 125 might be adjacently mounted in the minute-hand gear 112 to provide five succeeding exposures taken one every minute, the next following pin 125 could then be spaced for an exposure to be made in 7 minutes or 13 minutes thereafter and other pins 125 spaced for exposures at varying periods of time within the hourly rotation of the gear 112.

In order to reduce the size or, more specifically, the length of the film magazine 24, I space the film feed and receiving spools as closely together as practically possible, in other words, the distance between the centers of the film-feed and film-receiving spools is only slightly greater than the diameter of a film reel containing one-half of the entire length of the film originally wound on the feed reel.

It is obvious that various changes and modifications in the construction and arrangement of the various parts, members and elements may readily be made by those skilled in the art to which my invention relates upon perusal of the attached drawings and the above specification, hence, I do not wish to be understood as limiting myself to the particular construction and arrangement shown herein for purposes of illustrating my invention which is particularly defined in the appended claims.

I claim:

1. In automatically operable photographic apparatus for making a series of periodic time-record photographic exposures on a film strip, and in combination, a housing provided with photographic lens, a shutter, a film compartment within said housing provided with a film exposure aperture, an unexposed film reel and a film-receiving spool in said compartment, a motor, a drive shaft driven by said motor, intermittently operable means driven by said drive shaft adapted for periodically moving the film at spaced intervals of time across said aperture, means for photographically recording on each exposure of the film the time at which each exposure was made, comprising a clock dial-plate positioned within the field of said aperture close to the film and adapted to impose a photographic silhouette of a marginally disposed clock-dial upon each film exposure and having a central opening within the dial portion through which the photographic image is projected and recorded on the film, hour and minute hands mounted for movement adjacent said clock dial-plate within substantially the area of the marginal clock-dial, clock-actuated means for supporting and moving said hands, said hands being disposed close to said dial-plate whereby a silhouette of said hands is photographically imposed, in conjunction with the silhouette of said clock-dial, upon each film exposure, and means for actuating said shutter in synchronous operation with said intermittently operable means to thereby expose the film to a photographic image projected through said lens and said dial-plate opening during each stationary position of the film.

2. In photographic apparatus as defined in claim 1 wherein said intermittently operable means includes a shaft adapted to be intermittently driven by said motor-driven drive shaft, a clutch for coupling said driven shaft to said drive shaft, electrical control means for controlling the operation of said clutch, and means movable by said clock-actuated means for periodically actuating said electrical control means.

3. In photographic apparatus as defined in claim 1 wherein said intermittently operable means includes mechanical means for periodically moving the film and electrical control means for controlling the operation of said mechanical film-moving means, and adjustable means movable by said clock-actuated means for periodically actuating said electrical control means, said adjustable means being adapted to selectively vary the periodic intervals between actuations of said electrical control means.

4. In photographic apparatus as defined in claim 1 wherein said clock-actuated means includes a clock mechanism, a ring gear carrying said hour hand, and a ring gear carrying said minute hand, said gears being mounted concentrically relatively to one other and relatively to the center of said aperture and being driven by said clock mechanism.

5. Automatically operable photographic apparatus for making a series of periodic time-recorded photographic exposures on a film strip comprising a housing provided with photographic lens, said housing having a film compartment provided with a film exposure aperture aligned with said lens and containing a film reel and a film-receiving spool, a film-driving sprocket, a clock dial-plate positioned within said aperture close to the film adapted to impose a photographic silhouette of a marginally disposed clock-dial upon each film exposure and having a central opening within the dial portion for projection therethrough of the photographic image, hour and minute hands mounted for movement adjacent said clock dial-plate within substantially the area of the marginal clock-dial, clock-actuated mechanism for supporting and moving said hands, a silhouette of said hands being photographically imposed, in conjunction with the silhouette of said clock-dial, upon each film exposure, a shutter, a drive shaft, a motor for rotating said drive shaft, a slip drive mechanism driven by said drive shaft for rotating said film-receiving spool, an intermittently rotatable driven shaft, intermittently operable electrically-controlled clutch means for intermittently coupling said driven shaft with said drive shaft, means actuated by said driven shaft adapted to intermittently rotate said sprocket to cause periodic movements of the film across said aperture, and means actuated by said driven shaft for intermittently actuating said shutter in synchronous operation with said sprocket-rotating means to thereby expose the film to a photographic image projected through said lens and said dial-plate opening during each stationary position of the film to provide a series of time-recorded photographic exposures thereon.

6. In photographic apparatus as defined in claim 1 and including said unexposed film reel having a spool on which the unexposed film is wound and the distance between the axial centers of said spools being only slightly greater than the diameter of a film reel containing one-half of the entire length of the unexposed film originally contained in said unexposed film reel.

7. In photographic apparatus including a housing having lens, a shutter, and a film reel compartment provided with a film exposure aperture, the combination with means for periodically moving the film across said aperture to produce a series of photographic exposures thereon, of means for photographically recording on each exposure of the film the time at which each exposure was made, comprising a clock dial-plate positioned within the field of said aperture close to the film and adapted to impose a photographic silhouette of a marginally disposed clock-dial upon each film exposure and having a central opening within the dial portion through which the photographic image is projected and recorded on the film, hour and minute hands mounted for movement adjacent said clock dial-plate within substantially the area of the marginal clock-dial, clock-actuated means for supporting and moving said hands, said hands being disposed close to said dial-plate whereby a silhouette of said hands is photographically imposed, in conjunction with the silhouette of said clock-dial, upon each film exposure, and means for actuating said shutter in synchronous operation with said intermittently operable means to thereby expose the film to a photographic image projected through said lens and said dial-plate opening during each stationary position of the film.

8. In photographic apparatus as defined in claim 1 wherein said intermittently operable means includes mechanical means for periodically intermittently moving the film and electrical control means including an intermittently operable control switch for controlling the operation of said mechanical film-moving means, and wherein said clock-actuated means comprises a clock mechanism, a ring gear carrying said hour hand, a ring gear carrying said minute hand, said gears being mounted concentrically relatively one to the other and relatively to the center of said aperture and being driven by said clock mechanism, and including said minute-hand-carrying ring gear having sixty circularly arranged equally spaced openings therein adapted to receive therein one or more actuator pins, said pin or pins being adapted to actuate said intermittently operable control switch to thereby actuate said mechanical means through said electrical control means to cause successive periodic intermittent movements of the film and shutter.

9. In photographic apparatus of the character described including a housing lens, a shutter, a reeled film, a drive sprocket for moving the film, a film-receiving spool, slip-motion propelling means for rotating said film-receiving spool, an exposure aperture, a clock dial-plate adapted to impose a photographic silhouette of a marginally disposed clock-dial upon each film exposure and having a central opening within said marginal dial portion through which the photographic image is projected and recorded on the film, hour and minute hands mounted for movement adjacent said clock dial-plate within substantially the area of the marginal clock-dial, and clock-actuated means supporting and moving said hands including adjustable means adapted to selectively periodically actuate a main control two-way switch; the combination with a mechanism comprising a motor-driven drive shaft, driving means driven by said drive shaft for actuating said film-receiving spool propelling means, a driven shaft adapted to be intermittently driven by said drive shaft, shutter operating means actuable by said driven shaft, a Geneva movement driven by said driven shaft for intermittently rotating said drive sprocket, a spring-actuated clutch normally coupling said driven shaft with said drive shaft, and a cam for said clutch adapted to operatively disengage said driven shaft from said drive shaft, of an electrical control system comprising a main control two-way switch, a normally deenergized solenoid having a plunger normally engaged with said clutch cam to thereby retain said clutch in disengaged position, a locking relay, a resetting relay, a locking relay circuit normally closed on one side of said two-way switch to energize the electromagnet of said locking relay, a solenoid circuit including an intermediate switch normally permitted to close by the release of the spring-actuated armature of the deenergized resetting relay upon the energization of said locking relay electromagnet, said solenoid circuit being adapted to be closed through the closing of the normally open other side of said two-way switch to energize said solenoid and retract said plunger from its engagement with said cam to thereby release said clutch into operative position to cause said mechanism to simultaneously initiate the movement of the shutter and the movement of said film a length of one exposure by means of said Geneva movement and while said film is stationary continue the movement of said shutter to open and close said lens, a resetting relay circuit including the electromagnet of said resetting relay and a normally open switch to retain said resetting relay electromagnet normally deenergized, said solenoid plunger carrying an arm adapted to close said normally open switch in said resetting circuit, after said plunger has been retracted to release said clutch into operative position, to cause the energization of said resetting relay electromagnet and thereby move its armature to open said intermediate solenoid switch to permit said plunger to drop into engagement with said cam to thereby actuate the clutch into operatively disengaged position to stop the rotation of said driven shaft, the periodic actuation of said main control two-way switch by said clock-actuated adjustable means causing the closing of said normally open other side of said two-way switch.

HERMAN J. FOWLER.